United States Patent
Nam et al.

(10) Patent No.: US 7,139,042 B2
(45) Date of Patent: Nov. 21, 2006

(54) DISPLAY DEVICE WITH CAPACITY OF DISPLAYING THREE-DIMENSIONAL IMAGES

(75) Inventors: Hee Nam, Yongin-si (KR); Jang-Doo Lee, Suwon-si (KR); Hyoung-Wook Jang, Yongin-si (KR); Myoung-Seop Song, Seoul (KR); Beom-Shik Kim, Seoul (KR)

(73) Assignee: Samsung SDI Co., Ltd., Suwon-si (KR)

( * ) Notice: Subject to any disclaimer, the term of this patent is extended or adjusted under 35 U.S.C. 154(b) by 58 days.

(21) Appl. No.: 10/858,841

(22) Filed: Jun. 1, 2004

(65) Prior Publication Data

US 2004/0263698 A1 Dec. 30, 2004

(30) Foreign Application Priority Data

Jun. 2, 2003 (KR) .................. 10-2003-0035428

(51) Int. Cl.
*G02F 1/1335* (2006.01)
*G02B 27/22* (2006.01)
*G03B 21/60* (2006.01)

(52) U.S. Cl. .............. 349/15; 349/9; 349/62; 359/458; 359/462; 359/464

(58) Field of Classification Search .......... 349/6, 349/15
See application file for complete search history.

(56) References Cited

U.S. PATENT DOCUMENTS 5,465,175 A 11/1995 Woodgate et al.
6,046,849 A 4/2000 Moseley et al.
6,157,424 A * 12/2000 Eichenlaub .................. 349/74
6,246,451 B1 * 6/2001 Matsumura et al. .......... 349/15
6,320,629 B1 * 11/2001 Hatano et al. ................ 349/15
6,559,911 B1 * 5/2003 Arakawa et al. ............. 349/96
6,876,495 B1 * 4/2005 Street .......................... 359/622
2003/0048237 A1 * 3/2003 Sato et al. ..................... 345/32

FOREIGN PATENT DOCUMENTS

JP 8-327948 12/1996

OTHER PUBLICATIONS

Patent Abstract of Japan, Publication No. 08-327948, Published on Dec. 13, 1996, in the name of Takasato.

* cited by examiner

*Primary Examiner*—Andrew Schechter
*Assistant Examiner*—W. Patty Chen
(74) *Attorney, Agent, or Firm*—Christie, Parker & Hale LLP

(57) ABSTRACT

A display device for selectively displaying any one of 2D and 3D images with a capacity of displaying the 3D image with the same resolution as that of the 2D image. The display device includes a light source radiating white colored light, and an image display unit receiving the light from the light source to display the desired images. A beam splitter is placed between the light source and the image display unit to split the light radiated from the light source in the directions of left and right eyes of the user, and feed the split light rays to the image display unit. An optical shutter is provided at any one of front and rear surfaces of the beam splitter. The optical shutter has a plurality of shutter members with variable light transmittance to control the light transmission such that at least one of the two-directional light rays split at the beam splitter reaches the user.

19 Claims, 11 Drawing Sheets

DISPLAY DEVICE WITH CAPACITY OF DISPLAYING THREE-DIMENSIONAL IMAGES

CROSS REFERENCE TO RELATED APPLICATION

This application claims priority to and the benefit of Korea Patent Application No. 2003-0035428 filed on Jun. 2, 2003 in the Korean Intellectual Property Office, the content of which is incorporated herein by reference.

BACKGROUND OF THE INVENTION (a) Field of the Invention

The present invention relates to a display device, and in particular, to a display device which selectively displays any one of two-dimensional (2D) and three-dimensional (3D) images, and has a capacity of displaying the 3D image with the same resolution as that of the 2D image.

(b) Description of Related Art

Generally, 3D displays supply different views to the left and the right eyes of the user such that the user can take the depth perception and tactility for the viewing images. The 3D displays may be classified into a stereoscopic display where the user should wear viewing aids, such as polarizing glasses, and an autostereoscopic display where the user can see the desired 3D image without wearing such viewing aids.

The common autostereoscopic display utilizes an optical separation element, such as a lenticular lens and a parallax barrier, to spatially separate the left eye image and the right eye image displayed at the image display unit in the directions of the left and the right eyes of the user, respectively. U.S. Pat. Nos. 5,465,175 and 6,046,849 disclose 3D image displays related to the autostereoscopic display.

However, with the conventional autostereoscopic display, the pixels provided at the image display unit are classified into the left eyed and the right eyed, and the left eye image is displayed at the left eyed pixels, and the right eye image is displayed at the right eyed pixels. Consequently, the resolution of the 3D image displayed by the display device is deteriorated to be lower than that of the 2D image by the half or less thereof.

SUMMARY OF THE INVENTION

In accordance with the present invention a display device is provided which displays a 3D image with the same resolution as that of the 2D image, and selectively displays any one of the 2D and the 3D images.

The display device includes a light source radiating white colored light, and an image display unit receiving the light from the light source to display the desired images. A beam splitter is placed between the light source and the image display unit to split the light radiated from the light source in the directions of left and right eyes of the user, and to feed the split light rays to the image display unit. An optical shutter is provided at any one of front and rear surfaces of the beam splitter and having a plurality of shutter members with variable light transmittance to control the light transmission such that at least one of the two-directional light rays split at the beam splitter reaches the user.

The image display unit is formed with a transmission type liquid crystal display.

The beam splitter is formed with a prism sheet having a surface facing the light source with a plurality of triangular prisms, or a lenticular lens sheet having a surface facing the light source with a plurality of lenticular lenses.

The optical shutter has first and second shutter members alternately and repeatedly arranged in the direction of the light splitting of the beam splitter, and the first and the second shutter members are placed at the optical paths directed toward the left and the right eyes of the user. A pair of the first and the second shutter members are placed corresponding to each triangular prism or lenticular lens.

The optical shutter may be formed with a normally white mode liquid crystal display.

The display device further includes a light gathering element placed between the image display unit and the beam splitter to focus the light rays toward the image display unit.

The display device further includes an image control unit connected to the image display unit to repeatedly feed the left and right eyed image signals for forming 2D or 3D images to the image display unit, and a shutter control unit connected to the optical shutter to feed the signals for switching the shutter members to the optical shutter.

In order to display a 2D image, the image control unit feeds the 2D image signals to the image display unit to display the 2D image at the image display unit, and the shutter control unit feeds the opening signals to all the shutter members to make the light transmission at the shutter members.

Furthermore, in order to display a 3D image, the image control unit feeds the left and the right eyed image signals to the image display unit such that the image display unit time-divisionally displays the left and the right eyed images. Frame synchronization signals are generated between the sections of left and right eyed image signals at the image control unit to transmit the frame synchronization signals to the shutter control unit. Upon receipt of the frame synchronization signals, the shutter control unit feeds first driving signals to the optical shutter in the section of left eyed image signals to open the second shutter members, and feeds second driving signals to the optical shutter in the section of right eyed image signals to open the first shutter members.

DETAILED DESCRIPTION

Figure 1:
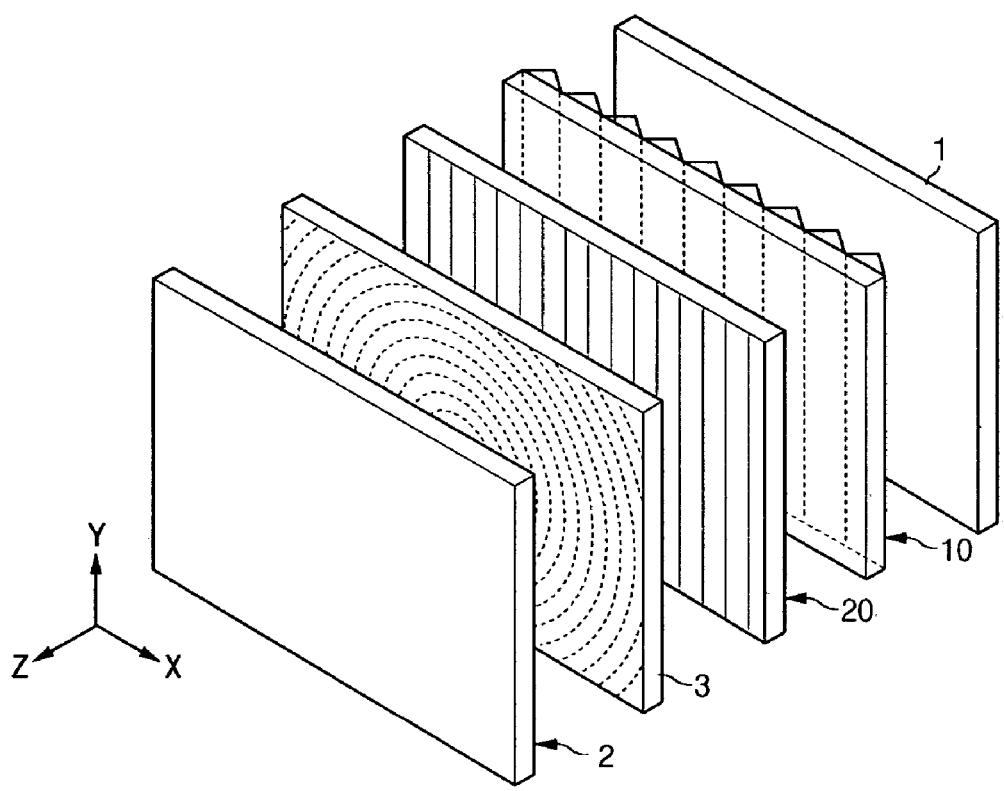
FIG. 1 is an exploded perspective view of a display device according to a first embodiment of the present invention.
Figure 2:
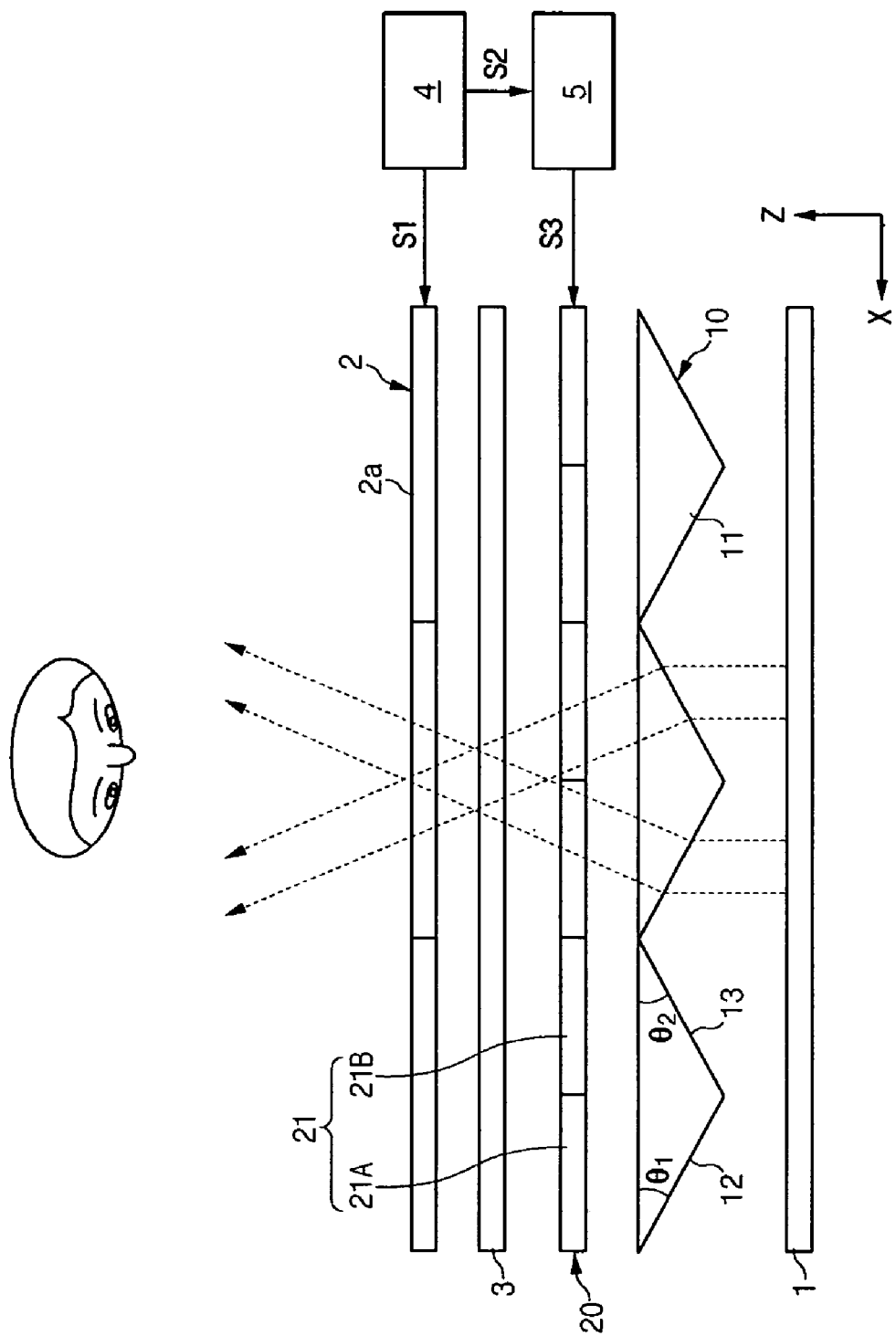
FIG. 2 is a partial sectional view of the display device according to the first embodiment of the present invention.

Referring to FIGS. 1 and 2, the display device has light source 1 radiating the white-colored light, beam splitter 10 placed front to light source 1 to split the light radiated from light source 1 in the directions of the left and the right eyes of the user, optical shutter 20 placed front to beam splitter 10 to transmit at least one of the two-directional light rays split at beam splitter 10, and image display unit 2 placed at the front of optical shutter 20 to display the desired images.

Image display unit 2 may be formed with a known transmission type liquid crystal display. Image display unit 2 has a plurality of red (R), green (G) and blue (B) pixels in the horizontal direction (in the direction of the X axis of the drawing) and in the vertical direction (in the direction of the Y axis of the drawing) to display the desired color images therewith.

Beam splitter 10 has a surface facing light source 1, and is formed with a prism sheet having a plurality of vertical triangular prisms 11. From the sectional viewpoint of the prism sheet, each triangular prism 11 has first and second lateral sides 12, 13 with incidence angles $\theta_1$, $\theta_2$, which have the same dimension. The distance between the centers of triangular prisms 11, that is, the pitch thereof may be identical with that of pixels 2a horizontally arranged among the pixels of image display unit 2.

Beam splitter 10 refracts the light ray incident upon first lateral side 12 of triangular prism 11 among the light radiated from light source 1 in the direction of the left eye, and refracts the light ray incident upon second lateral side 13 of prism 11 in the direction of the right eye, thereby splitting the light radiated from light source 1 in the directions of the left and the right eyes of the user.

Optical shutter 20 has a plurality of shutter members 21 with variable light transmittance, and selectively transmits at least one of the two-directional light rays split at beam splitter 10. For this purpose, optical shutter 20 has first and second shutter members 21A, 21B alternately and repeatedly arranged in the direction of the light splitting of beam splitter 10 (proceeding in the horizontal direction of the screen, that is, in the X axis direction of the drawing). First shutter member 21A is placed at the optical path directed toward the left eye of the user, and second shutter member 21B is placed at the optical path directed toward the right eye of the user.

First and second shutter members 21A, 21B are, in an exemplary embodiment, arranged corresponding to each triangular prism 11 formed at beam splitter 10 one by one. Optical shutter 20 is, in an exemplary embodiment, structured with a variation of a normally white mode liquid crystal display where the light transmission is made with no voltage application.

Figure 3:
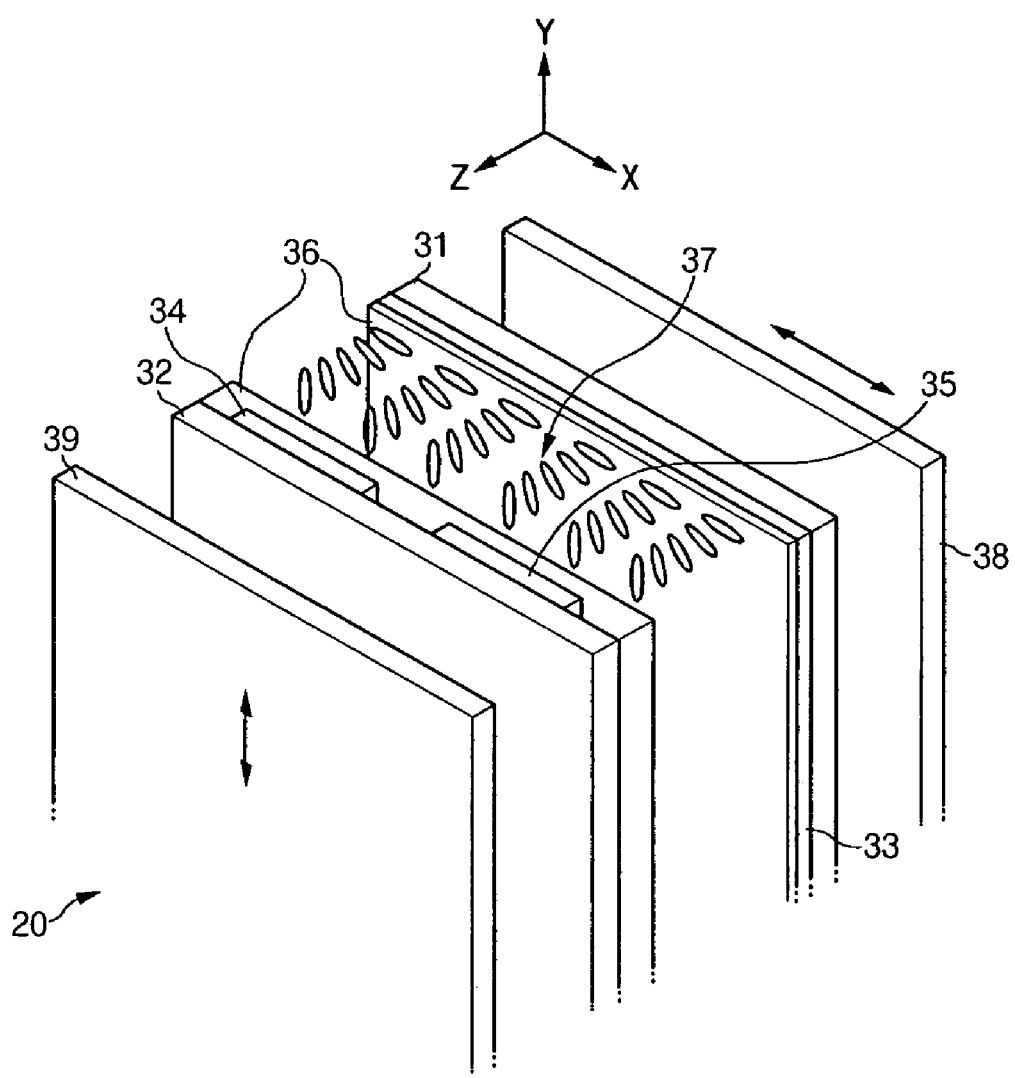
FIG. 3 is a partial exploded perspective view of an optical shutter for the display device with a liquid crystal display.

Referring now to FIG. 3, an exploded perspective view of an optical shutter with a liquid crystal display is shown. Optical shutter 20 has first and second substrates 31, 32 facing each other with a predetermined distance therebetween. Common electrode 33 is formed on the inner surface of first substrate 31. First and second electrodes 34, 35 are formed on the inner surface of second substrate 32 while being stripe-patterned in the vertical direction of the screen (in the Y axis direction of the drawing). Alignment layers 36 are formed on the inner surfaces of first and second substrates 31, 32 while covering common electrode 33 and first and second substrates 34, 35. Liquid crystal layer 37 is placed between the pair of alignment layers 36. First and second polarizing plates 38, 39 attached to the external surfaces of first and second substrates 31, 32.

First and second electrodes 34, 35 are alternately and repeatedly arranged in the horizontal direction of the screen (in the X axis direction). First and second electrodes 34, 35 are placed corresponding to each triangular prism 11 formed at beam splitter 10 one by one such that the pitch of first and second electrodes 34, 35 is half the pitch of triangular prisms 11. First electrodes 34 are electrically connected to each other to receive the same voltage, and second electrodes 35 are also electrically connected to each other to receive the same voltage.

Liquid crystal layer 37 is, in an exemplary embodiment, formed with a twisted nematic (TN) liquid crystal having a twist angle of 90°. The TN liquid crystal molecules are kept to be twisted at 90° with no voltage application, and under the application of a predetermined voltage, aligned vertical to first and second substrates 31, 32.

First and second polarizing plates 38, 39 provide linear polarization, and selectively transmit only the light ray vibrated in any one of the horizontal and vertical directions of the screen. The polarizing axes of first and second polarizing plates 38, 39 proceed perpendicular to each other.

First and second electrodes 34, 35 facing common electrode 33, along with interposing liquid crystal layer 37, form first and second shutter members 21A, 21B, respectively. Optical shutter 20 alters the twist angle of the liquid crystal using the voltage signals applied to first and second electrodes 34, 35, and controls the light transmission of first and second shutter members 21A, 21B, thereby switching shutter members 21.

Further, as seen in FIGS. 1 and 2, light gathering element 3 is disposed at the rear of image display unit 2, in an exemplary embodiment, between image display unit 2 and optical shutter 20 to gather the light diffused toward image display unit 2. A fresnel lens is preferably provided as light gathering element 3. The fresnel lens has a band sawtooth concentrically formed on a surface facing the optical shutter 20.

With the above-structured display device, image display unit 2 is connected to image control unit 4 to receive image signals S1. Optical shutter 20 is connected to shutter control unit 5 driven upon receipt of frame synchronization signals S2 from image control unit 4 to receive driving signals for switching first and second shutter members 21A, 21B.

The display device may selectively display 2D and 3D images depending upon the operation of optical shutter 20. The operational principle of the 2D mode of the display device will be explained with reference to FIG. 4, and the operational principle of the 3D mode thereof with reference to FIGS. 5, 6A, 6B, 7A and 7B.

Figure 4:
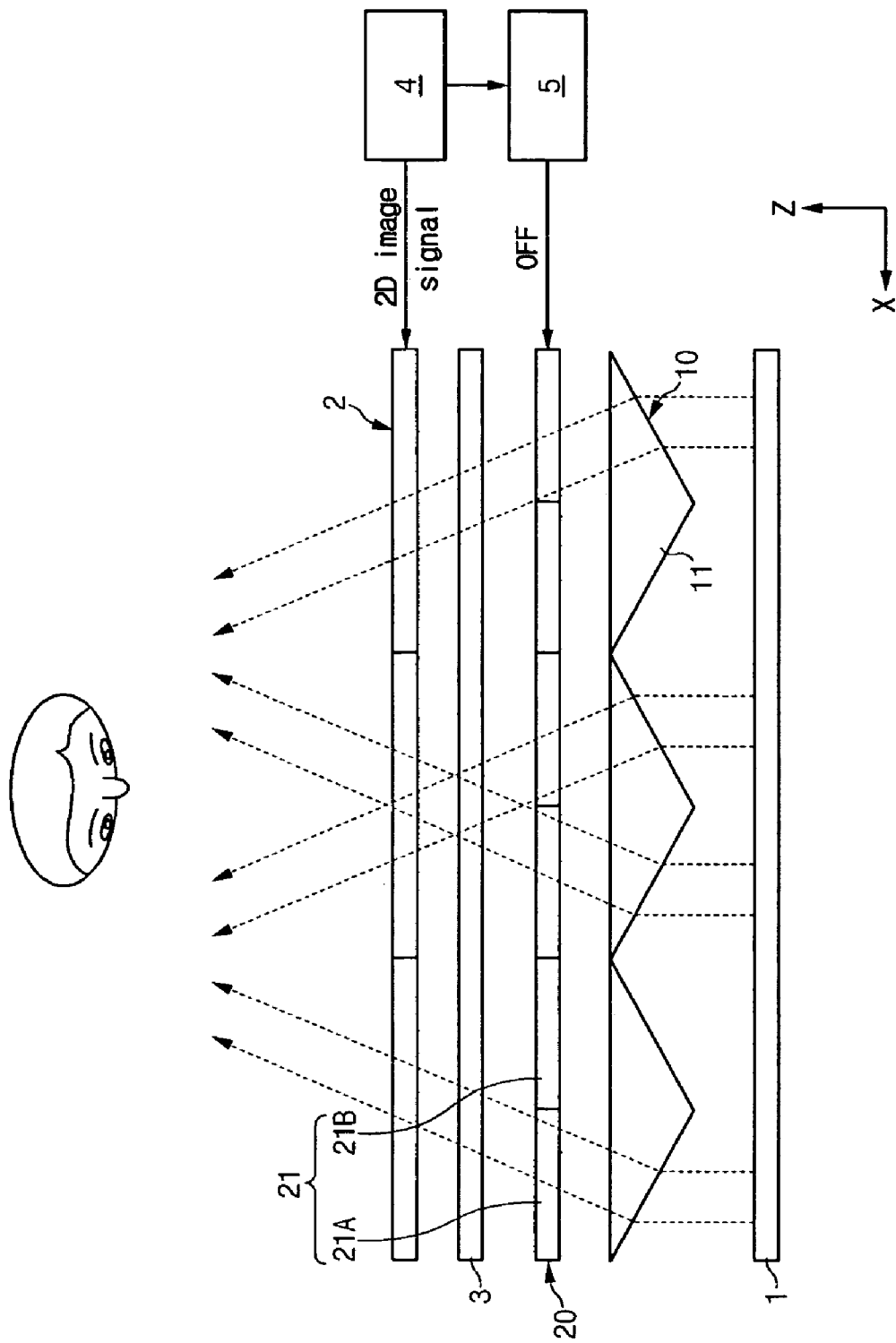
FIG. 4 is a partial sectional view of the display device illustrating the operational principle of the 2D mode thereof.

First, as shown in FIG. 4, with the 2D mode, image control unit 4 feeds the 2D image signal to image display unit 2, and shutter members 21 of optical shutter 20 are all off. The light rays passed through beam splitter 10 all transmit to image display unit 2. Consequently, the user takes the same 2D image view by the left and the right eyes, thereby watching the 2D image.

As shown in FIG. 3, the transmission function of optical shutter 20 is made by taking a normally white mode liquid crystal display structure, in which the optical shutter transmits the light with no voltage application.

When the pitch of prisms 11 is established to be identical with the pitch of first or second shutter members 21A, 21B of optical shutter 20, even though the pitch of prisms 11 does not correctly agree with the pixel pitch of image display unit 2, left and right incidence angles $\theta_1$ and $\theta_2$ of triangular prism 11 are controlled such that the light rays passed through first or second lateral surfaces 12, 13 of triangular prism 11 pass through all the pixels of image display unit 2, thereby preventing the resolution of the display device from being deteriorated.

Figure 5:
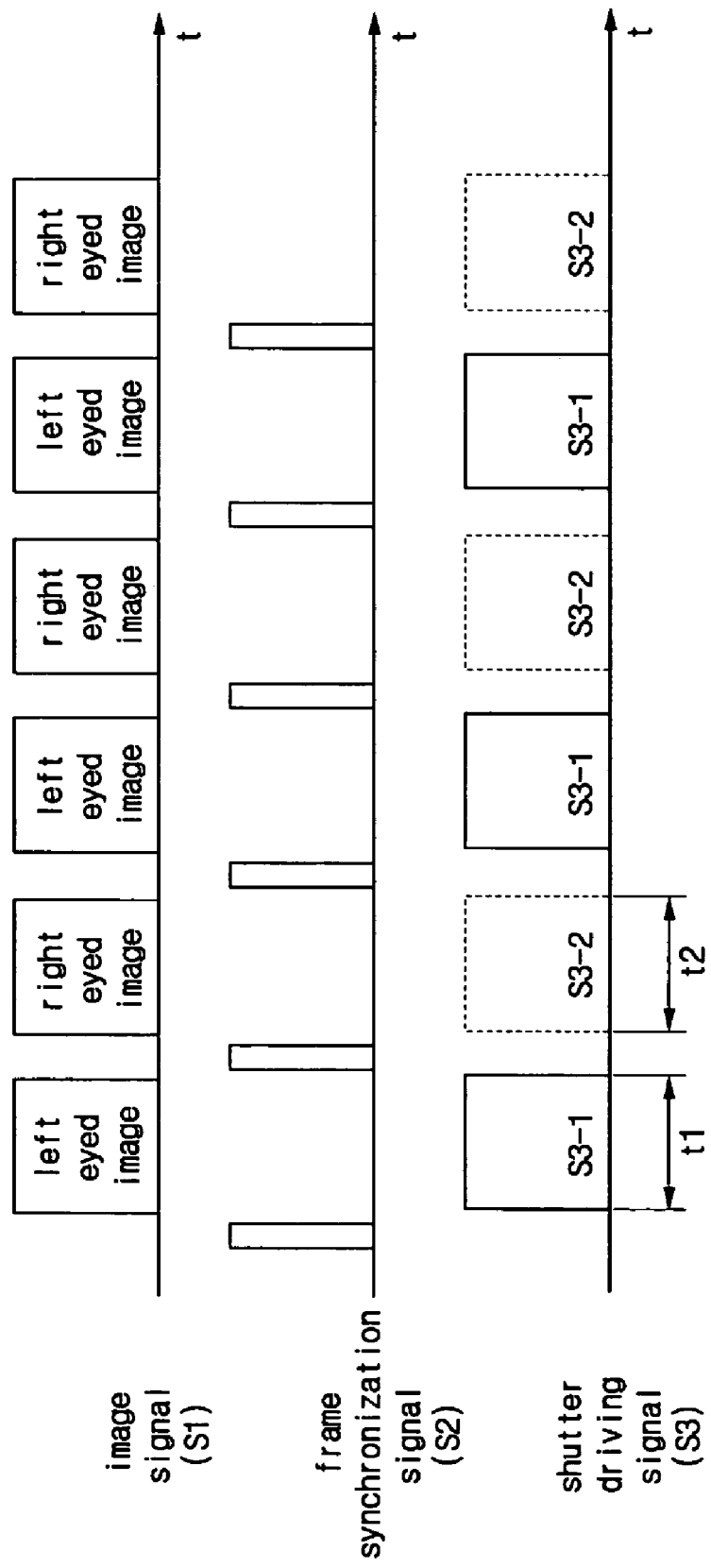
FIG. 5 is a voltage waveform chart of the display device illustrating the operational principle of the 3D mode thereof.

Then, with the 3D mode, as shown in FIG. 5, image control unit 4 repeatedly feeds left and right eyed image signals to image display unit 2 at the frequency of 80–100 Hz such that image display unit 2 time-divisionally drives the left and right-eyed images. At the same time, image control unit 4 generates frame synchronization signals S2 between the left and the right-eyed image signals, and feeds them to shutter control unit 5.

Shutter control unit 5 generates first driving signals S3-1 for turning on second shutter members 21B of optical shutter 20 from the odd-numbered frame synchronization signals corresponding to the left-eyed image signals, and generates second driving signals S3-2 for turning on first shutter members 21A of the optical shutter from the even-numbered frame synchronization signals corresponding to the right-eyed images signals.

Figure 6A:
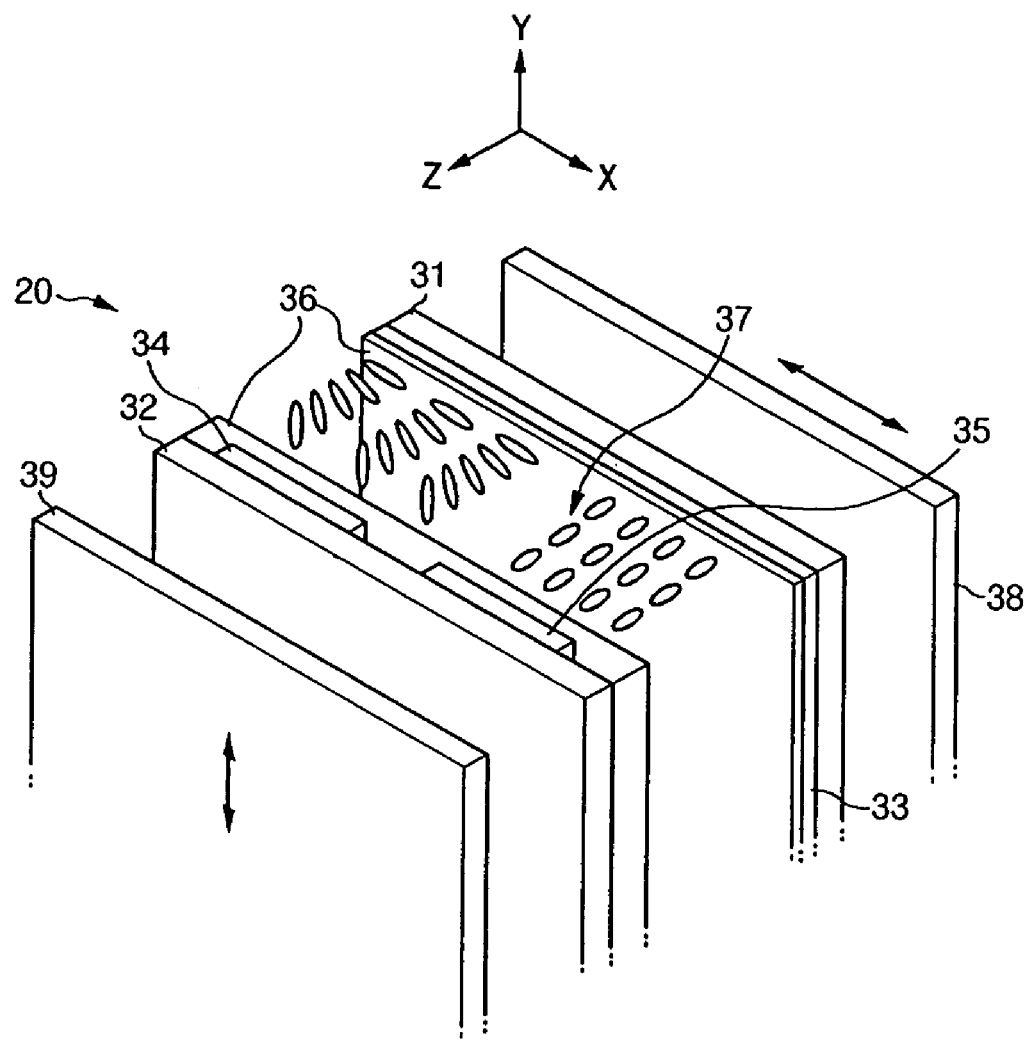
FIG. 6A is a partial exploded perspective view of the optical shutter at the time of t1 with the 3D mode thereof.

As shown in FIG. 6A, at the time of t1 shown in FIG. 5 when image display unit 2 displays the left-eyed image, the driving voltage is applied to second electrodes 35 while the ground voltage is applied to common electrode 33 of optical shutter 20, and the liquid crystal molecules of liquid crystal layer 37 facing second electrodes 35 are aligned vertical to first and second substrates 31, 32, thereby intercepting the light transmission of second shutter members 21B.

Figure 6B:
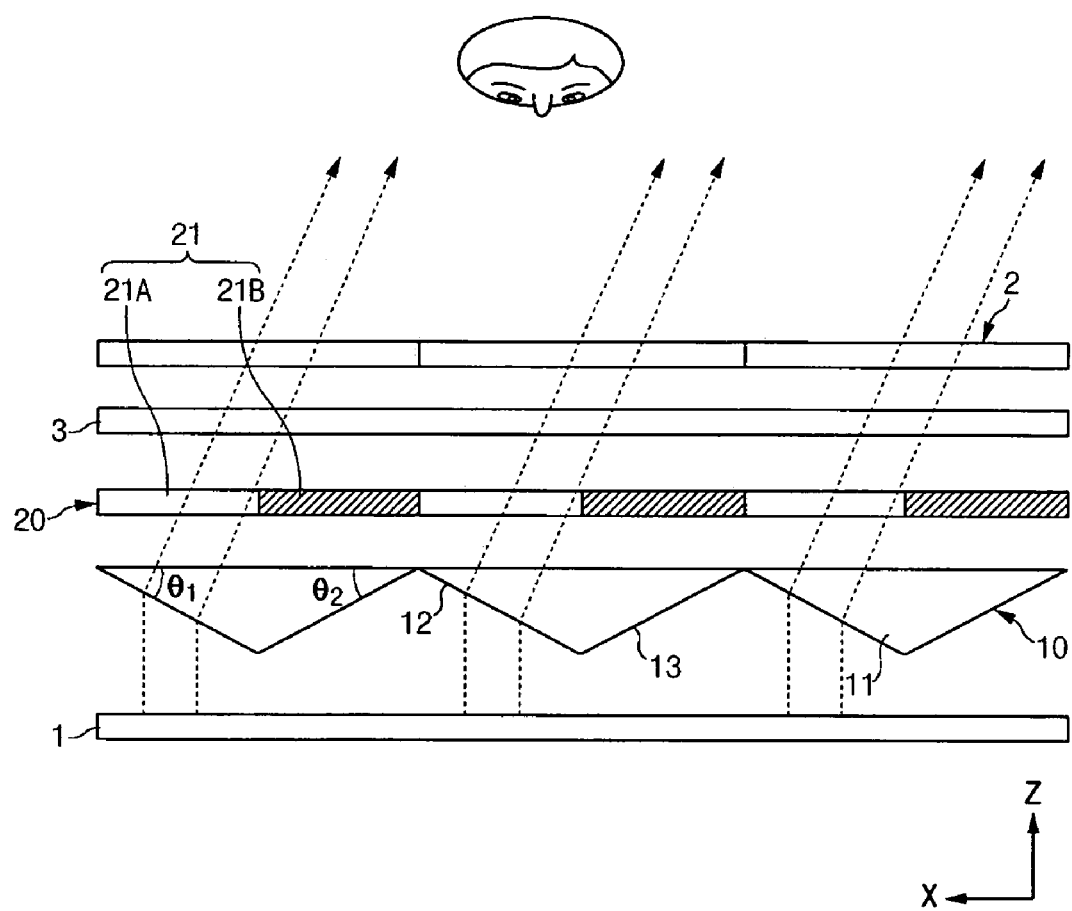
FIG. 6B is a partial sectional view of the display device illustrating the operational state thereof at the time of t1 with the 3D mode thereof.

Consequently, as shown in FIG. 6B, optical shutter 20 transmits only the light ray passed through first lateral surface 12 of triangular prism 11 among the light rays radiated from light source 1, and feeds it to image display unit 2 so that the left-eyed image displayed at image display unit 2 is given to the user in the direction of the left eye.

Figure 7A:
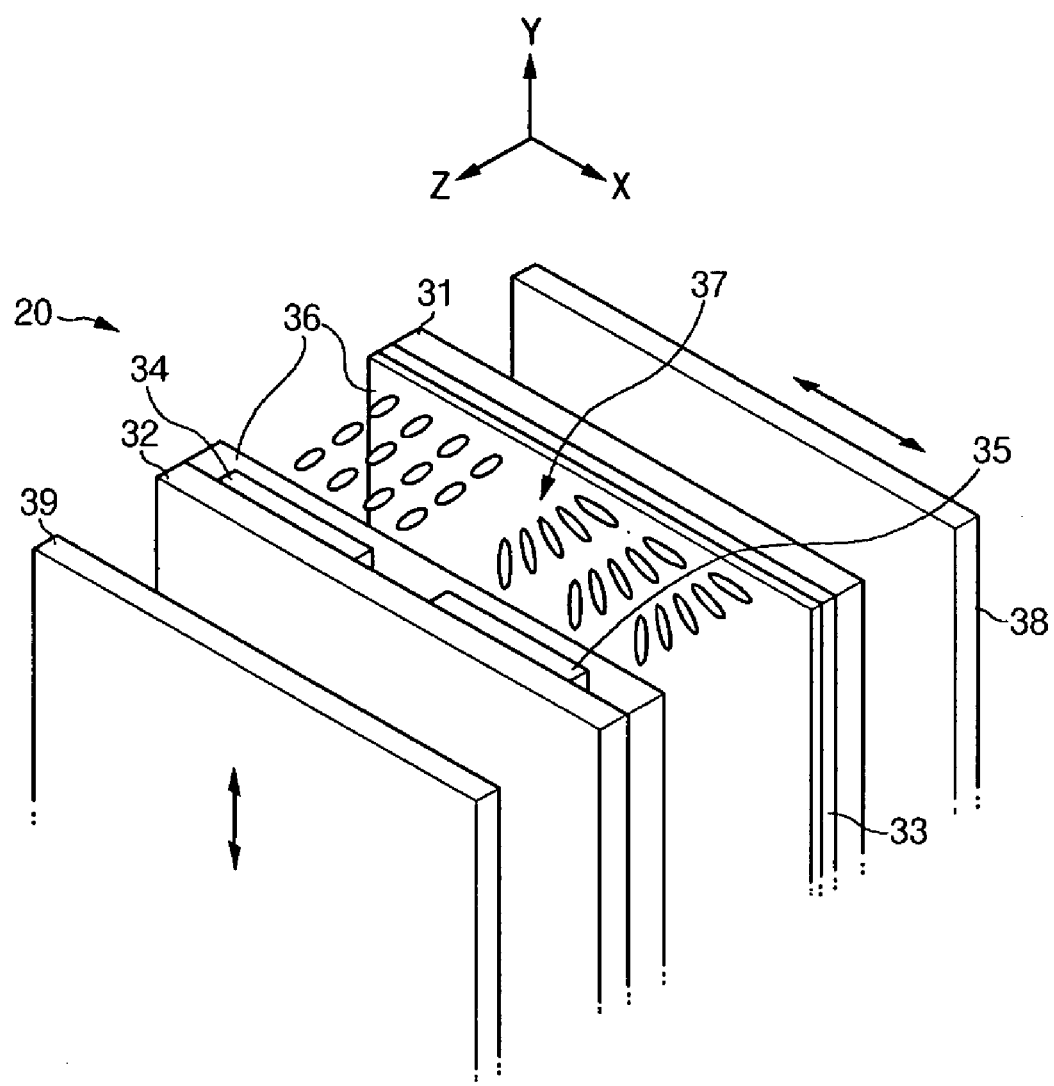
FIG. 7A is a partial exploded perspective view of the optical shutter at the time of t2 with the 3D mode thereof.

Furthermore, as shown in FIG. 7A, at the time of t2 shown in FIG. 5 when image display unit 2 displays the right-eyed image, the driving voltage is applied to first electrodes 34 while the ground voltage is applied to common electrode 33 of optical shutter 20. The liquid crystal molecules of liquid crystal layer 37 facing first electrodes 34 are then aligned vertical to first and second substrates 31, 32, thereby intercepting the light transmission of first shutter members 21A.

Figure 7B:
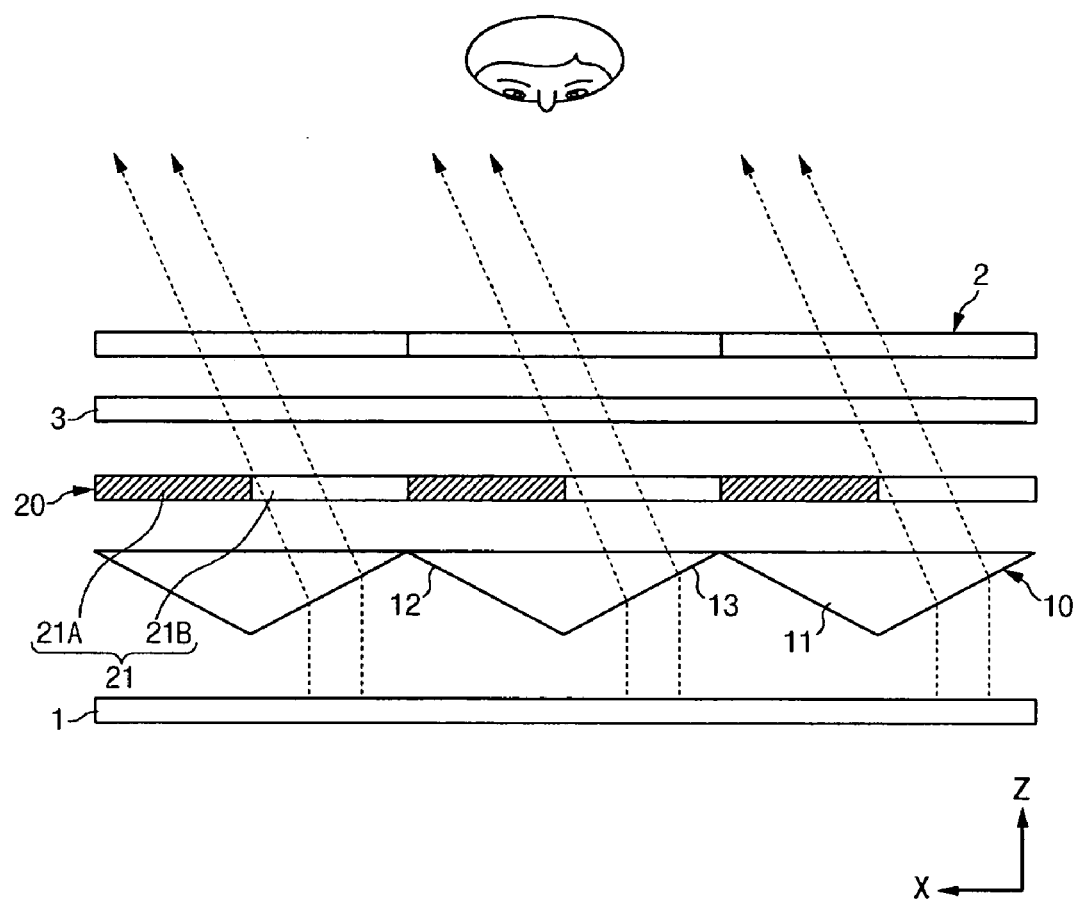
FIG. 7B is a partial sectional view of the display device illustrating the operational state thereof at the time of t2 with the 3D mode thereof.

Consequently, as shown in FIG. 7B, optical shutter 20 transmits only the light ray passed through second lateral surface 13 of triangular prism 11 among the light rays radiated from light source 1, and feeds it to image display unit 2 so that the left-eyed image displayed at image display unit 2 is given to the user in the direction of the right eye.

Figure 8:
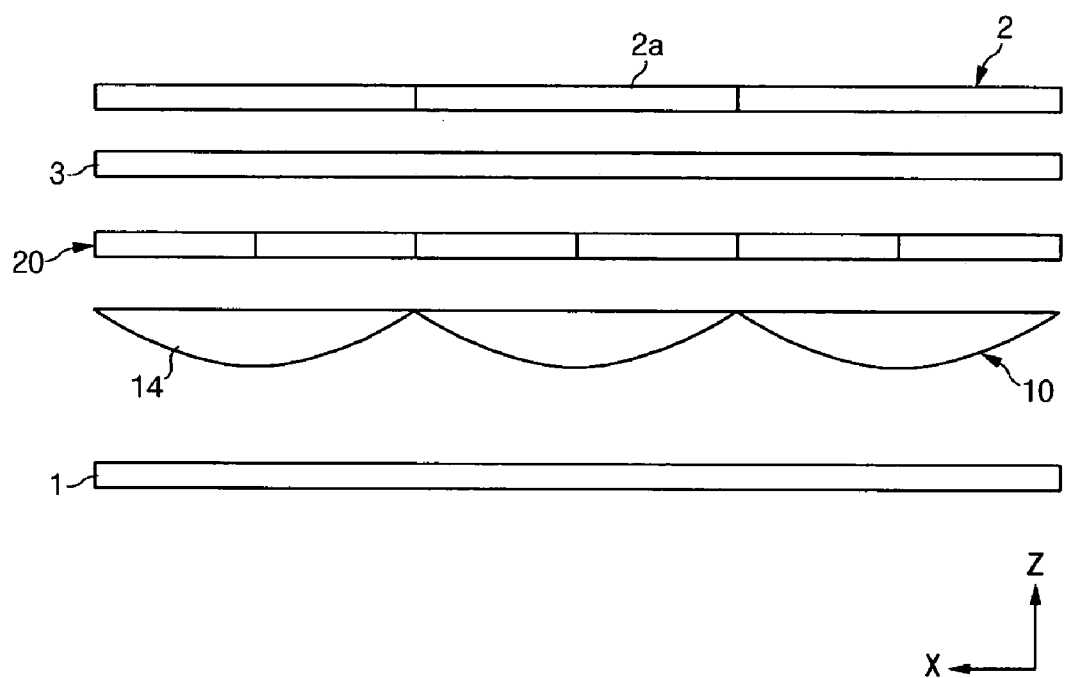
FIG. 8 is a partial sectional view of a display device according to a second embodiment of the present invention.

FIG. 8 is a partial amplified sectional view of a display device according to a second embodiment of the present invention. As shown in FIG. 8, the display device according to this embodiment basically has the structure related to the first embodiment of the present invention. However, beam splitter 10 is formed with a lenticular lens sheet having a surface facing light source 1 with a plurality of vertical lenticular lenses 14.

Figure 9:
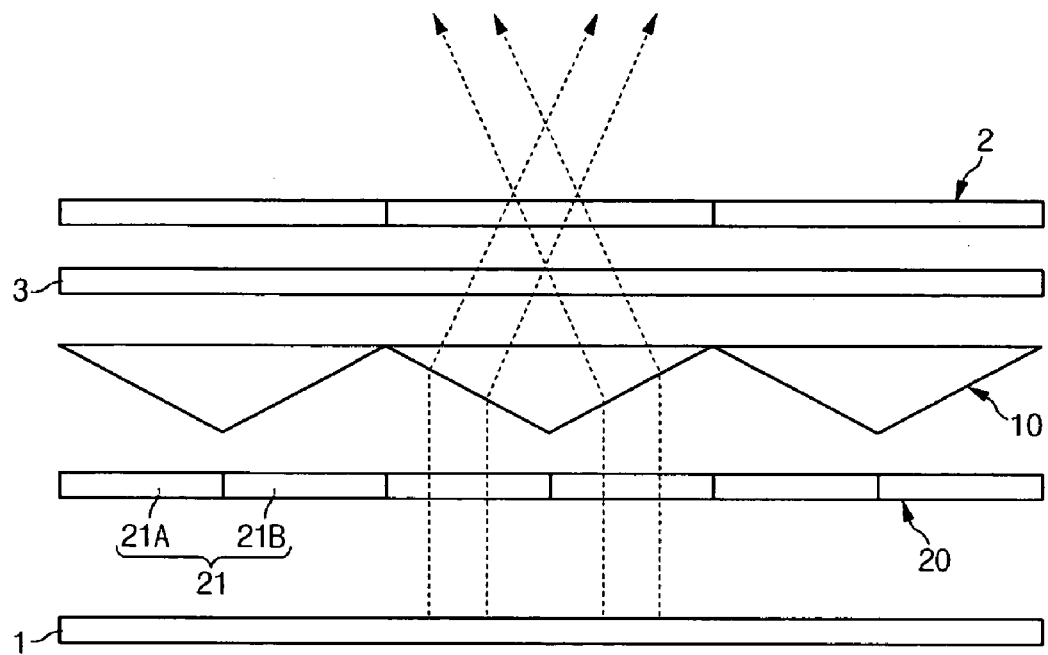
FIG. 9 is a partial sectional view of a display device according to a third embodiment of the present invention.

FIG. 9 is a partial amplified sectional view of a display device according to a third embodiment of the present invention. As shown in FIG. 9, the display device according to this embodiment basically has the structure related to the first embodiment of the present invention. However, optical shutter 20 is placed front to light source 1, and beam splitter 10 is placed front to optical shutter 20.

The display device according to the exemplary embodiments alternately and repeatedly conducts the operations at t1 and t2 to thereby display 3D images. The light rays incident upon image display unit 2 at t1 and t2 pass through all the pixels thereof, and the left and the right-eyed images given to the user have the same resolution as the 2D image.

With the display device according to the exemplary embodiments, the 2D and the 3D images are selectively displayed depending upon the operation of optical shutter 20, and the 3D image is displayed with the same resolution as the 2D image. In this connection, the light rays refracted in the directions of the left and right eyes of the user are fed to image display unit 2, thereby displaying the 3D image. With this structure, as it is only required that the pitches of beam splitter 10 and optical shutter 20 should be matched with each other, all the currently available image display units can be applied for use irrespective of the pixel sizes. Moreover, in case a prism sheet is used as beam splitter 10, it takes a role of bending the optical route. Accordingly, the viewing angle at which the user can see the 3D image becomes wider, compared to the case based on the lenticular lens or the parallax barrier.

Although exemplary embodiments of the present invention have been described in detail hereinabove, it should be clearly understood that many variations and/or modifications of the basic inventive concept herein taught which may appear to those skilled in the art will still fall within the spirit and scope of the present invention, as defined in the appended claims.

What is claimed is:

1. A display device comprising:
   a light source for radiating white colored light;
   an image display unit for receiving the white colored light from the light source to display desired images;
   a beam splitter placed between the light source and the image display unit to split the white colored light radiated from the light source into a first light ray in a direction of a left eye of a user and a second light ray in a direction of a right eye of the user, and to feed-the first light ray and the second light ray to the image display unit; and
   an optical shutter provided at any one of front and rear surfaces of the beam splitter and having a first shutter members and second shutter members with variable light transmittance to control the light transmission such that the first light ray split at the beam splitter reaches the user through the first shutter members and the second light ray split at the beam splitter reaches the user through the second shutter members, wherein the beam splitter has a first pitch and the optical shutter has a second pitch, and wherein the first pitch matches the second pitch.

2. The display device of claim 1 wherein the image display unit is formed with a transmission type liquid crystal display.

3. The display device of claim 1 wherein the beam splitter is formed with a prism sheet having a surface facing the light source with a plurality of triangular prisms.

4. display device of claim 1 wherein the beam splitter is formed with a lenticular lens sheet having a surface facing the light source with a plurality of lenticular lenses.

5. The display device of claim 1 wherein the first shutter members and the second shutter members of the optical shutter are alternately and repeatedly arranged such that the first shutter members and the second shutter members being placed at optical paths respectively direct the first beam and the second beam toward the left eye of the user and toward the right eye of the user.

6. The display device of claim 1 wherein the optical shutter is formed with a normally white mode liquid crystal display.

7. The display device of claim 6 wherein the optical shutter comprises:
a first substrate and a second substrate facing each other;
a common electrode formed on an inner surface of the first substrate;
first electrodes and second electrodes stripe-patterned on an inner surface of the second substrate and alternately and repeatedly arranged such that the first shutter members and the second shutter members respectively direct the first beam and the second beam toward the left eye of the user and toward the right eye of the user;
a pair of alignment layers formed on the inner surfaces of the first substrate and the second substrate while covering the common electrode and the first electrodes and the second electrodes;
a liquid crystal layer placed between the pair of the alignment layers, and a first polarizing plate and a second polarizing plate respectively attached to external surfaces of the first substrate and the second substrate, wherein the first electrodes and the second electrodes respectively correspond to the first shutter members and the second shutter members.

8. The display device of claim 1 further comprising a light gathering element placed between the image display unit and the beam splitter to focus the first light ray and the second light ray toward the image display unit.

9. The display device of claim 1 further comprising:
an image control unit connected to the image display unit to repeatedly feed left eyed image signals and right eyed image signals for forming 2D or 3D images to the image display unit; and
a shutter control unit connected to the optical shutter to feed to the optical shutter signals for switching the first shutter members and the second shutter members.

10. A method of driving the display device of claim 9 comprising:
feeding 2D image signals to the image display unit at the image control unit to display the 2D image at the image display unit; and
feeding opening signals to all the first shutter members and the second shutter members at the shutter control unit to provide light transmission at the first shutter members and the second shutter members.

11. A method of driving the display unit of claim 9 comprising:
alternately feeding the left eyed image signals and the right eyed image signals to the image display unit at the image control unit such that the image display unit time-divisionally displays left eyed images and right eyed images;
generating frame synchronization signals between sections of the left eyed image signals and the right eyed image signals at the image control unit to transmit the frame synchronization signals to the shutter control unit; and
upon receipt of the frame synchronization signals at the shutter control unit, feeding first driving signals to the optical shutter in the section of the left eyed image signals to open the first shutter members, and feeding second driving signals to the optical shutter in the section of the right eyed image signals to open the second shutter members.

12. The display device of claim 1 wherein the image display unit comprises a plurality of pixels, and wherein the first shutter members and the second shutter members of the optical shutter are alternately and repeatedly arranged such that one of the first shutter members and a corresponding one of the second shutter members are paired to correspond to a corresponding one of the plurality of pixels.

13. The display device of claim 1 further comprising a light gathering element placed between the image display unit and the optical shutter to focus the first light ray and the second light ray toward the image display unit.

14. The display device of claim 1 wherein the first light ray split is controlled to reach the user through the first shutter members at a first time period and the second light ray is controlled to reach the user through the second shutter members at a second time period.

15. A display device comprising:
a light source for radiating white colored light;
an image display unit for receiving the white colored light from the light source to display desired images;
a beam splitter placed between the light source and the image display unit to split the white colored light radiated from the light source into a first light ray in a direction of a left eye of a user and a second light ray in a direction of a right eye of the user, and to feed the first light ray and the second light ray to the image display unit; and
an optical shutter provided at any one of front and rear surfaces of the beam splitter and having a first shutter members and second shutter members with variable light transmittance to control the light transmission such that the first light ray split at the beam splitter reaches the user through the first shutter members and the second light ray split at the beam splitter reaches the user through the second shutter members, wherein the beam splitter is formed with a prism sheet having a surface facing the light source with a plurality of triangular prisms, and wherein the first shutter members and the second shutter members of the optical shutter are alternately and repeatedly arranged such that one of the first shutter members and a corresponding one of the second shutter members are paired to correspond to a corresponding one of the triangular prisms.

16. A display device comprising:
a light source for radiating white colored light;
an image display unit for receiving the white colored light from the light source to display desired images;
a beam splitter placed between the light source and the image display unit to split the white colored light radiated from the light source into a first light ray in a direction of a left eye of a user and a second light ray in a direction of a right eye of the user, and to feed the first light ray and the second light ray to the image display unit; and
an optical shutter provided at any one of front and rear surfaces of the beam splitter and having a first shutter members and second shutter members with variable light transmittance to control the light transmission such that the first light ray split at the beam splitter reaches the user through the first shutter members and the second light ray split at the beam splitter reaches the user through the second shutter members, wherein the beam splitter is formed with a lenticular lens sheet having a surface facing the light source with a plurality of lenticular lenses, and wherein the first shutter members and the second shutter members of the optical shutter are alternately and repeatedly arranged such that one of the first shutter members and a corresponding one of the second shutter members are paired to correspond to a corresponding one of the lenticular lenses.

17. A display device comprising:
a light source for radiating white colored light;
an image display unit for receiving the white colored light from the light source to display desired images;
a beam splitter placed between the light source and the image display unit to split the white colored light radiated from the light source into a first light ray in a direction of a left eye of a user and a second light ray in a direction of a right eye of the user, and to feed the first light ray and the second light ray to the image display unit; and
an optical shutter provided at any one of front and rear surfaces of the beam splitter and having a first shutter members and second shutter members with variable light transmittance to control the light transmission, wherein the beam splitter is placed between the image display unit and the optical shutter, wherein the beam splitter has a first pitch and the optical shutter has a second pitch, and wherein the first pitch matches the second pitch.

18. A display device comprising:
a light source for radiating white colored light;
an image display unit for receiving the white colored light from the light source to display desired images;
a beam splitter placed between the light source and the image display unit to split the white colored light radiated from the light source into a first light ray in a direction of a left eye of a user and a second light ray in a direction of a right eye of the user, and to feed the first light ray and the second light ray to the image display unit; and
an optical shutter provided at any one of front and rear surfaces of the beam splitter and having a first shutter members and second shutter members with variable light transmittance to control the light transmission such that the first light ray split at the beam splitter reaches the user through the first shutter members and the second light ray split at the beam splitter reaches the user through the second shutter members, wherein the beam splitter is formed with a prism sheet having a surface facing the light source with a plurality of triangular prisms, wherein the triangular prisms have a first pitch and the optical shutter has a second pitch, and wherein the first pitch matches the second pitch.

19. The display device of claim 18 wherein the optical shutter comprises;
a first substrate and a second substrate facing each other;
a common electrode formed on an inner surface of the first substrate;
first electrodes and second electrodes stripe-patterned on an inner surface of the second substrate and alternately and repeatedly arranged such that the first shutter members and the second shutter members respectively direct the first beam and the second beam toward the left eye of the user and toward the right eye of the user;
a pair of alignment layers formed on the inner surfaces of the first substrate and the second substrate while covering the common electrode and the first electrodes and the second electrodes;
a twisted nematic (TN) liquid crystal layer placed between the pair of the alignment layers, and a first polarizing plate and a second polarizing plate respectively attached to external surfaces of the first substrate and the second substrate, wherein the first electrodes and the second electrodes respectively correspond to the first shutter members and the second shutter members, wherein the first electrodes and the second electrodes have a third pitch, and wherein the third pitch is half the first pitch of the triangular prisms.

* * * * *

UNITED STATES PATENT AND TRADEMARK OFFICE
CERTIFICATE OF CORRECTION

PATENT NO. : 7,139,042 B2 Page 1 of 1
APPLICATION NO. : 10/858841
DATED : November 21, 2006
INVENTOR(S) : Hee Nam et al.

It is certified that error appears in the above-identified patent and that said Letters Patent is hereby corrected as shown below:

| | |
|---|---|
| Column 6, line 35, Claim 1 | Delete "feed-the", Insert --feed the-- |
| Column 6, line 39, Claim 1 | Delete "a" |
| Column 6, line 55, Claim 4 | Before "display", Insert --The-- |
| Column 8, line 24, Claim 15 | Delete "a" |
| Column 8, line 52, Claim 16 | Delete "a" |
| Column 9, line 33, Claim 18 | Delete "a" |
| Column 10, line 10, Claim 19 | Delete "comprises;", Insert --comprises:-- |

Signed and Sealed this

Eleventh Day of November, 2008

JON W. DUDAS
*Director of the United States Patent and Trademark Office*